(12) United States Patent
Lien et al.

(10) Patent No.: US 9,535,513 B2
(45) Date of Patent: Jan. 3, 2017

(54) THIN ELECTROMAGNETIC HANDWRITING PEN AND METHOD OF MANUFACTURING THE SAME

(71) Applicant: Wacom Co., Ltd., Saitama (JP)

(72) Inventors: Chien-Chia Lien, Miaoli County (TW); Hung-I Wang, Chiayi (TW); Cheng-Lu Liu, Hsinchu (TW)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/280,650

(22) Filed: May 18, 2014

(65) Prior Publication Data

US 2015/0212606 A1 Jul. 30, 2015

(30) Foreign Application Priority Data

Jan. 29, 2014 (TW) ............................. 103103491 A (51) Int. Cl.
*G06F 3/033* (2013.01)
*G06F 3/0354* (2013.01)
*G06F 3/044* (2006.01)
*G06F 3/046* (2006.01)

(52) U.S. Cl.
CPC ........... *G06F 3/03545* (2013.01); *G06F 3/044* (2013.01); *G06F 3/046* (2013.01)

(58) Field of Classification Search
CPC .............................. G06F 3/03545; G06F 3/046
USPC ........................................................ 345/179
See application file for complete search history.

(56) References Cited

U.S. PATENT DOCUMENTS 5,895,895 A * 4/1999 Ono et al. .................. 178/19.03
6,623,136 B1 9/2003 Kuo
7,202,862 B1 * 4/2007 Palay et al. .................... 345/179
2010/0038152 A1 * 2/2010 Kaneda ............... G06F 3/03545
178/18.07
2011/0175854 A1 * 7/2011 Lien et al. .................... 345/179
(Continued)

FOREIGN PATENT DOCUMENTS

| EP | 2 650 761 A2 | 10/2013 | |
| TW | M445213 U1 * | 1/2013 | ............ G06F 3/033 |
| TW | 201403399 A | 1/2014 | |

OTHER PUBLICATIONS

Taiwanese Office Action dated May 26, 2015, for corresponding TW Application No. 103103491, 6 pages.

*Primary Examiner* — Chanh Nguyen
*Assistant Examiner* — Yuzhen Shen
(74) *Attorney, Agent, or Firm* — Seed IP Law Group LLP (57) ABSTRACT

A thin electromagnetic handwriting pen includes a casing unit, a circuit unit, an electromagnetic unit and a pen core unit. The casing unit includes a thin pen-shaped casing structure. The circuit unit includes a circuit substrate disposed inside the thin pen-shaped casing structure. The electromagnetic unit includes a hollow holder and an electromagnetic coil wound around the hollow holder. Both the hollow holder and the electromagnetic coil are embedded in the thin pen-shaped casing structure, and the electromagnetic coil is fixed between the thin pen-shaped casing structure and the hollow holder and electrically connected to the circuit substrate. The pen core unit includes a pen core structure movably disposed inside the thin pen-shaped casing structure and passing through the hollow holder, and one portion of the pen core structure is exposed outside the thin pen-shaped casing structure.

13 Claims, 10 Drawing Sheets

(56) References Cited

U.S. PATENT DOCUMENTS

| | | | |
|---|---|---|---|
| 2012/0146913 A1* | 6/2012 | Linn .............................. | 345/169 |
| 2013/0269446 A1 | 10/2013 | Fukushima et al. | |
| 2014/0043300 A1* | 2/2014 | Lien ............................. | 345/179 |
| 2014/0069532 A1* | 3/2014 | Obata .......................... | 137/554 |
| 2014/0118311 A1* | 5/2014 | Yeh et al. ..................... | 345/179 |
| 2015/0035807 A1* | 2/2015 | Ito et al. ....................... | 345/179 |

* cited by examiner

THIN ELECTROMAGNETIC HANDWRITING PEN AND METHOD OF MANUFACTURING THE SAME

BACKGROUND OF THE INVENTION

1. Field of the Invention

The instant disclosure relates to an electromagnetic handwriting pen and a method of manufacturing the same, and more particularly to a thin electromagnetic handwriting pen and a method of manufacturing the same.

2. Description of Related Art

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor, and an electromagnetic touch control device requires a special battery powered pen for input; while the working principle of a capacitive touch control device relies on capacitive coupling, which takes place as soon as the capacitive touch sensor is touched by a conductive object, and the touch position can then be identified according to the variation in capacitance at the touch point. Therefore, a capacitive touch control device does not require an input pen that consumes electricity. Nor is it necessary to subject a capacitive touch sensor to concentrated pressure application for deformation, and thus a capacitive touch control device has a longer service life. Furthermore, mass production of capacitive touch control devices requires lower costs due to its simple construction, less components and higher yield rate.

A capacitive touch control device can be operated in many ways. The most common of all is using a conductor, for example a finger or a pen, to touch or slide on the surface of the capacitive touch control device, for the capacitive touch sensor thereof to generate a response signal. However, as capacitive touch control devices find more and more applications, the lower precision on position detection tends to hinder smoothness of operation where more precise and more efficient detection is required, such as in handheld devices. In order to enable enhanced precision on position detection, many people choose to use pens for capacitive touch input.

SUMMARY OF THE INVENTION

One aspect of the instant disclosure relates to a thin electromagnetic handwriting pen and a method of manufacturing the same.

One of the embodiments of the instant disclosure provides a thin electromagnetic handwriting pen, comprising: a casing unit, a circuit unit, an electromagnetic unit, a pen core unit, a connection unit and an elastic unit. The casing unit includes a thin pen-shaped casing structure. The circuit unit includes a circuit substrate disposed inside the thin pen-shaped casing structure. The electromagnetic unit includes a hollow holder and an electromagnetic coil wound around the hollow holder, wherein both the hollow holder and the electromagnetic coil are embedded in the thin pen-shaped casing structure, and the electromagnetic coil is fixed between the thin pen-shaped casing structure and the hollow holder and electrically connected to the circuit substrate. The pen core unit includes a pen core structure movably disposed inside the thin pen-shaped casing structure and passing through the hollow holder, wherein one portion of the pen core structure is exposed outside the thin pen-shaped casing structure. The connection unit includes a connection structure disposed inside the thin pen-shaped casing structure and positioned on the circuit substrate. The elastic unit includes an elastic structure disposed inside the thin pen-shaped casing structure and connected between the pen core structure and the connection structure.

More precisely, the thin pen-shaped casing structure includes a first hollow outer tube, a second hollow outer tube and a pen tail cover, and the second hollow outer tube has two opposite lateral portions respectively mated with the first hollow outer tube and the pen tail cover, wherein the second hollow outer tube has a stop portion disposed on the inner surface thereof, the circuit substrate has an abutting portion abutted against the stop portion of the second hollow outer tube, and the circuit substrate has at least two positioning holes adjacent to the connection structure and at least one positioning groove adjacent to the connection structure.

More precisely, the hollow holder has a coil winding portion and a coil guiding portion connected to the coil winding portion, the coil winding portion has a coil winding space, and the coil guiding portion has at least two coil guiding grooves communicated with the coil winding space, wherein the electromagnetic coil has a main coil portion wound around the coil winding portion and received in the coil winding space and two guiding coil portions respectively connected to two opposite ends of the main coil portion and respectively received in the at least two coil guiding grooves, and the main coil portion of the electromagnetic coil is totally enclosed inside the first hollow outer tube, and each guiding coil portion of the electromagnetic coil has a soldering portion exposed outside the first hollow outer tube to electrically connect to the circuit substrate.

More precisely, the pen core structure includes a metal pen core movably passing through the hollow holder and a plastic pen head connected to one end of the metal pen core, and one portion of the plastic pen head is exposed outside the first hollow outer tube of the thin pen-shaped casing structure.

Another one of the embodiments of the instant disclosure provides a thin electromagnetic handwriting pen, comprising: a casing unit, a circuit unit, an electromagnetic unit and a pen core unit. The casing unit includes a thin pen-shaped casing structure. The circuit unit includes a circuit substrate disposed inside the thin pen-shaped casing structure. The electromagnetic unit includes a hollow holder and an electromagnetic coil wound around the hollow holder, wherein both the hollow holder and the electromagnetic coil are embedded in the thin pen-shaped casing structure, and the electromagnetic coil is fixed between the thin pen-shaped casing structure and the hollow holder and electrically connected to the circuit substrate. The pen core unit includes a pen core structure movably disposed inside the thin pen-shaped casing structure and passing through the hollow holder, wherein one portion of the pen core structure is exposed outside the thin pen-shaped casing structure.

Yet another one of the embodiments of the instant disclosure provides a method of manufacturing a thin electromagnetic handwriting pen, comprising: winding an electromagnetic coil around a hollow holder; forming a first hollow outer tube to enclose the electromagnetic coil and fix the electromagnetic coil between the first hollow outer tube and the hollow holder, wherein the electromagnetic coil has two soldering portions exposed outside the first hollow outer tube; sequentially inserting a pen core structure, an elastic structure, a connection structure and one portion of a circuit substrate into the first hollow outer tube, wherein one portion of the pen core structure is exposed outside the first hollow outer tube; electrically connecting the two soldering portions of the electromagnetic coil to the circuit substrate; and mating a second hollow outer tube with the first hollow outer tube and mating a pen tail cover with the second hollow outer tube for enclosing the other portion of the circuit substrate.

Therefore, the electromagnetic coil can be fixed between the thin pen-shaped casing structure and the hollow holder and electrically connected to the circuit substrate due to the design of both the hollow holder and the electromagnetic coil are embedded in the thin pen-shaped casing structure and the processes of winding an electromagnetic coil around a hollow holder and forming a first hollow outer tube to enclose the electromagnetic coil. Whereby, the hollow holder and the electromagnetic coil of the electromagnetic unit can be fixed inside the thin pen-shaped casing structure without using any prior detachable holder to occupy the thickness of the thin pen-shaped casing structure, so as to achieve the thin design of the thin electromagnetic handwriting pen. Hence, the thin electromagnetic handwriting pen can be applied to the thin portable electronic device, for example, the thin electromagnetic handwriting pen can be inserted into the edge hole of the thin portable electronic device.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
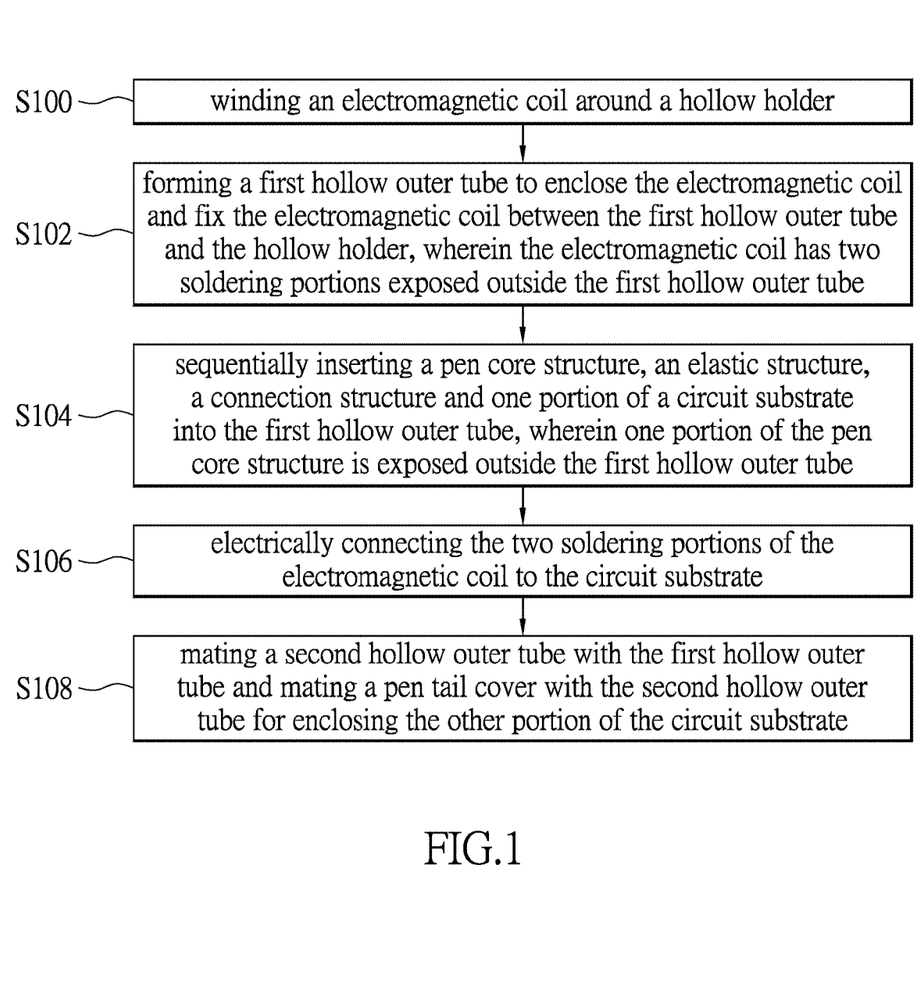
FIG. 1 shows a flow chart of the method of manufacturing a thin electromagnetic handwriting pen according to the instant disclosure.
Figure 2:
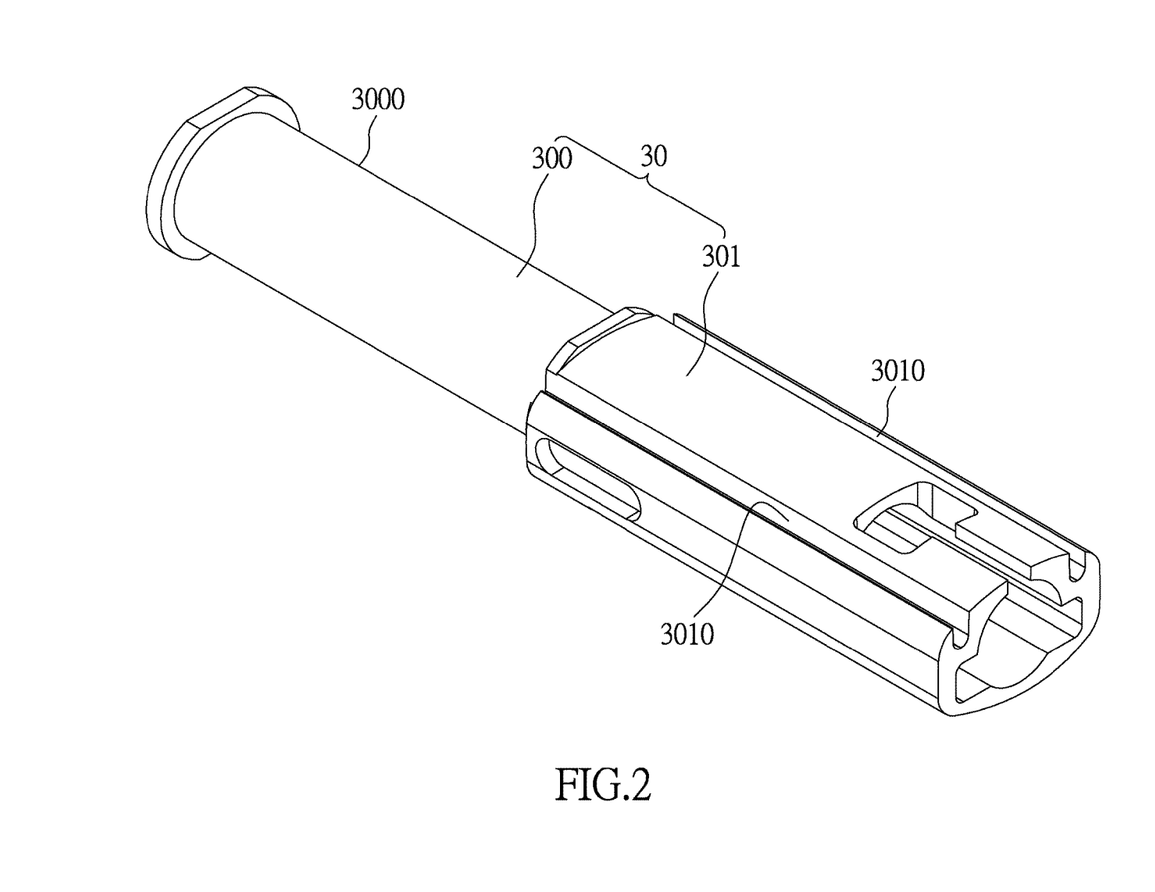
FIG. 2 shows a perspective, schematic view of the hollow holder of the thin electromagnetic handwriting pen according to the instant disclosure.
Figure 3:
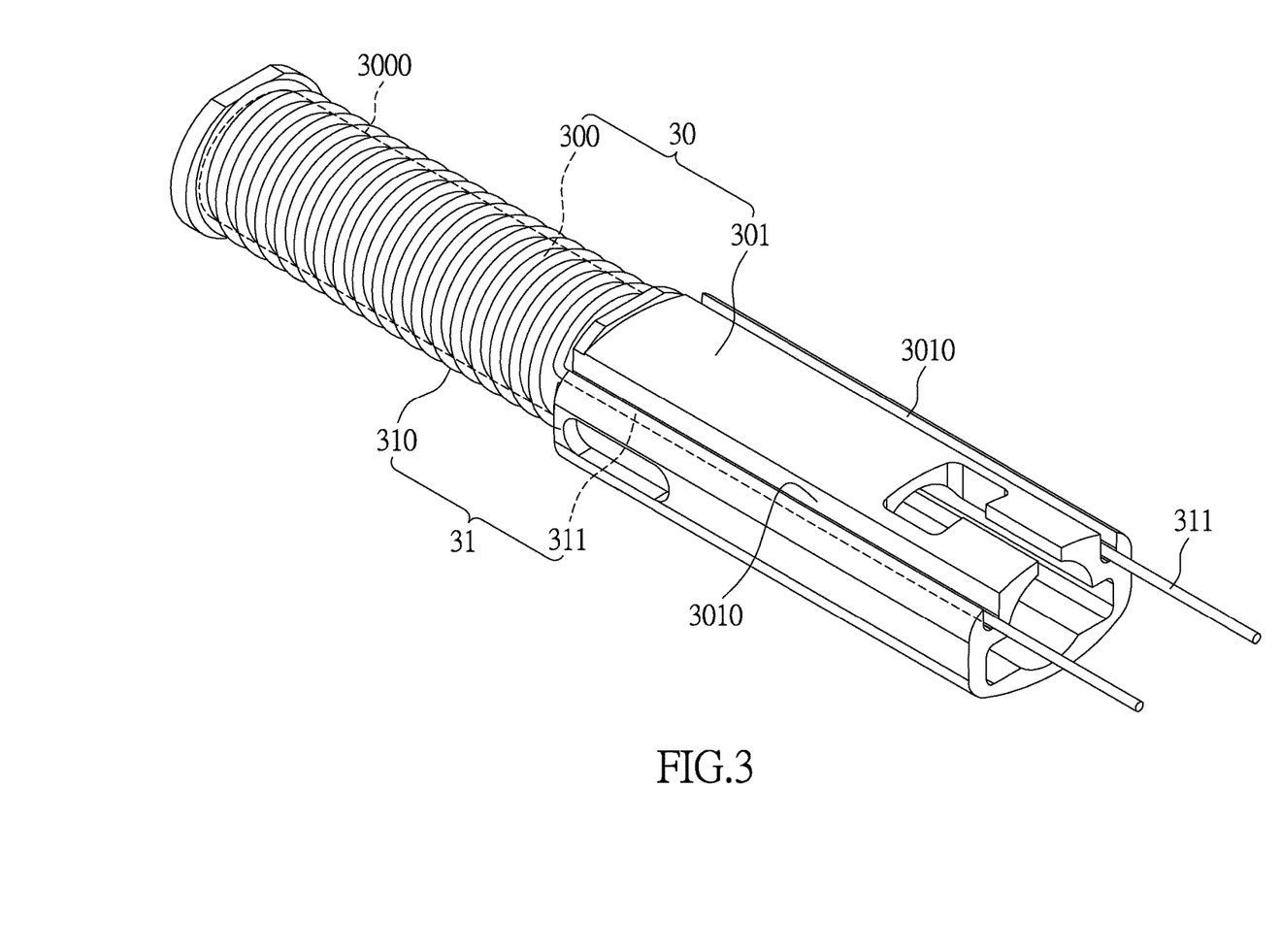
FIG. 3 shows a perspective, schematic view of the step S100 of the method of manufacturing a thin electromagnetic handwriting pen according to the instant disclosure.

Referring to FIG. 1 to FIG. 10, the instant disclosure provides a method of manufacturing a thin (or flat) electromagnetic handwriting pen Z, comprising the following steps:

First, step S100 is that: referring to FIG. 1, FIG. 2 and FIG. 3, winding an electromagnetic coil 31 around a hollow holder 30. More precisely, referring to FIG. 2, the hollow holder 30 has a coil winding portion 300 and a coil guiding portion 301 connected to the coil winding portion 300. The coil winding portion 300 has a coil winding space 3000 as a surrounding shape formed therearound, and the coil guiding portion 301 has at least two coil guiding grooves 3010 communicated with the coil winding space 3000. In addition, referring to FIG. 3, the electromagnetic coil 31 has a main coil portion 310 wound around the coil winding portion 300 and received in the coil winding space 3000 and two guiding coil portions 311 respectively connected to two opposite ends of the main coil portion 310 and respectively received in the at least two coil guiding grooves 3010. For example, the hollow holder 30 may be made of any high temperature resistant material, and the electromagnetic coil 31 may be an enamel-insulated wire.

Figure 4:
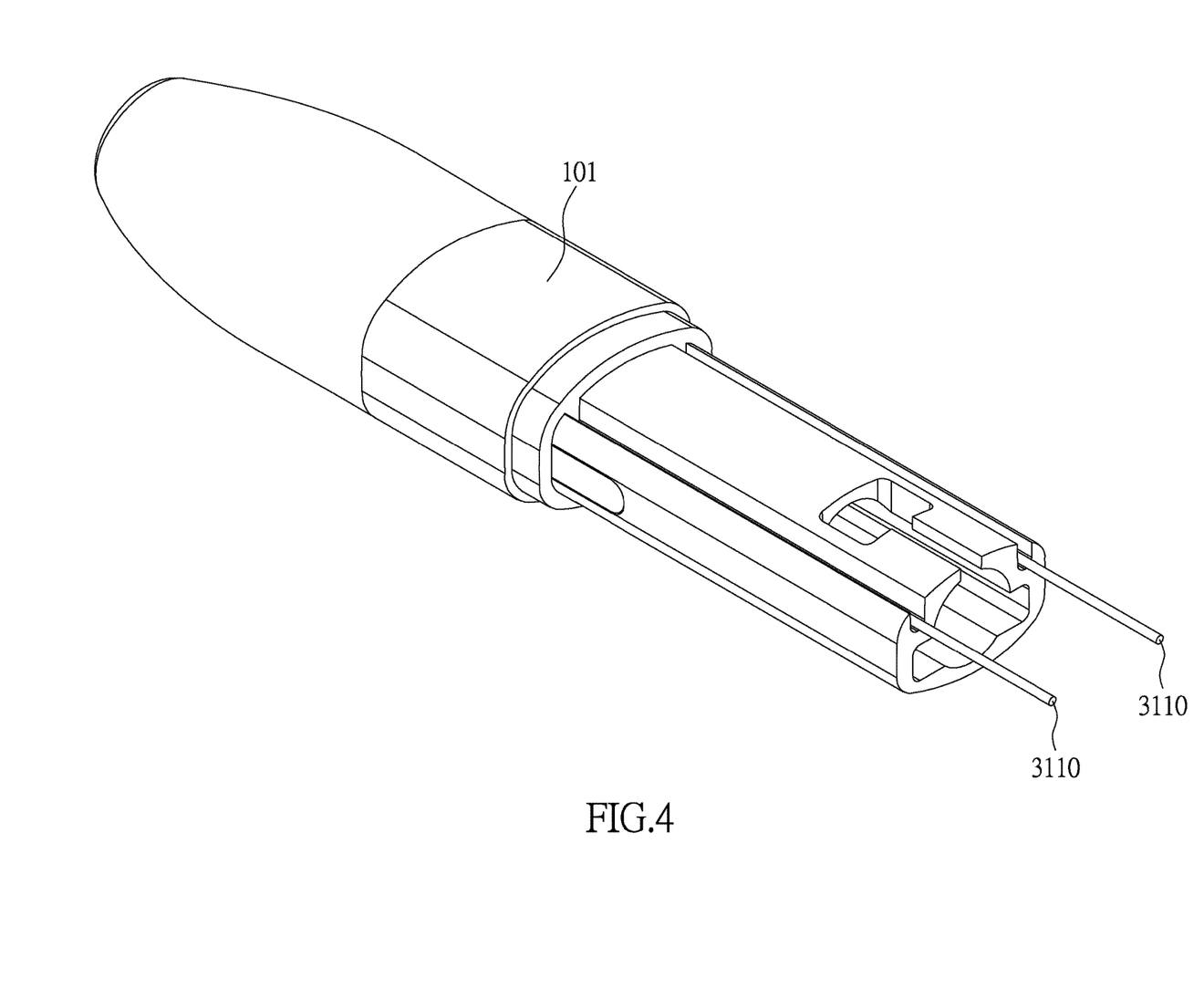
FIG. 4 shows a perspective, schematic view of the step S102 of the method of manufacturing a thin electromagnetic handwriting pen according to the instant disclosure.
Figure 5:
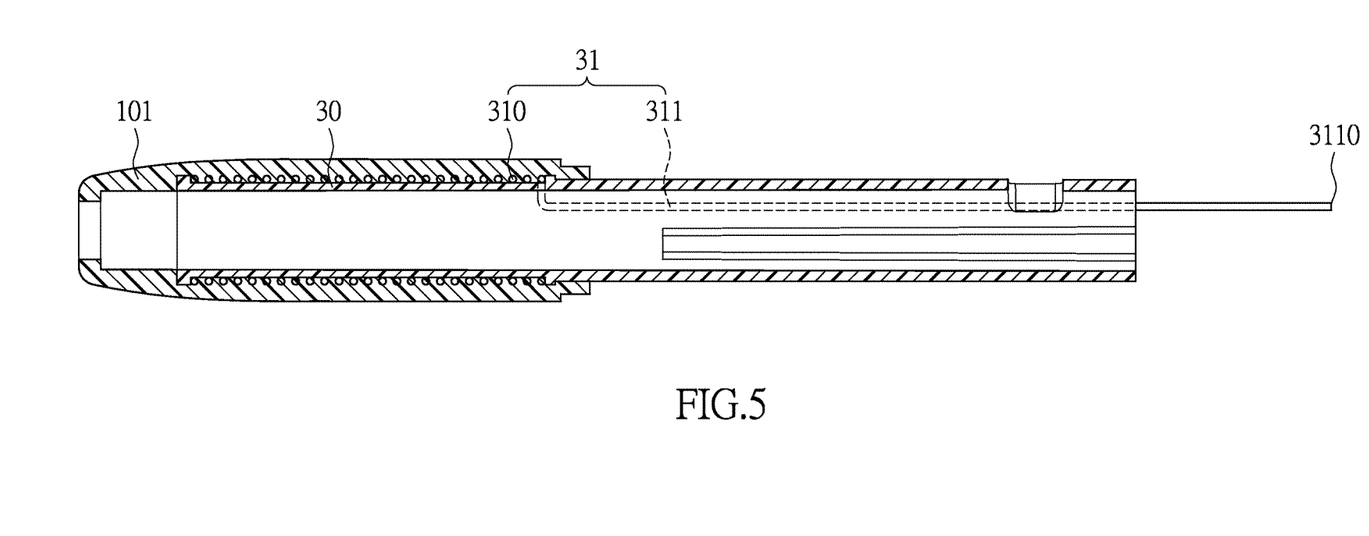
FIG. 5 shows a lateral, cross-sectional, schematic view of the step S102 of the method of manufacturing a thin electromagnetic handwriting pen according to the instant disclosure.

Next, step S102 is that: referring to FIG. 1, FIG. 4 and FIG. 5, forming a first hollow outer tube 101 to enclose the electromagnetic coil 31 and fix the electromagnetic coil 31 between the first hollow outer tube 101 and the hollow holder 30, wherein the electromagnetic coil 31 has two soldering portions 3110 exposed outside the first hollow outer tube 101. More precisely, both the hollow holder 30 and the electromagnetic coil 31 are embedded in the first hollow outer tube 101, the main coil portion 310 of the electromagnetic coil 31 is totally enclosed inside the first hollow outer tube 101, and the soldering portion 3110 of each guiding coil portion 311 of the electromagnetic coil 31 is exposed outside the first hollow outer tube 101 to prepare to electrically connect with the circuit substrate 20. For example, the first hollow outer tube 101 may be formed by an injection molding process or other forming process, and the electromagnetic coil 31 is enclosed by forming the first hollow outer tube 101.

Figure 6:
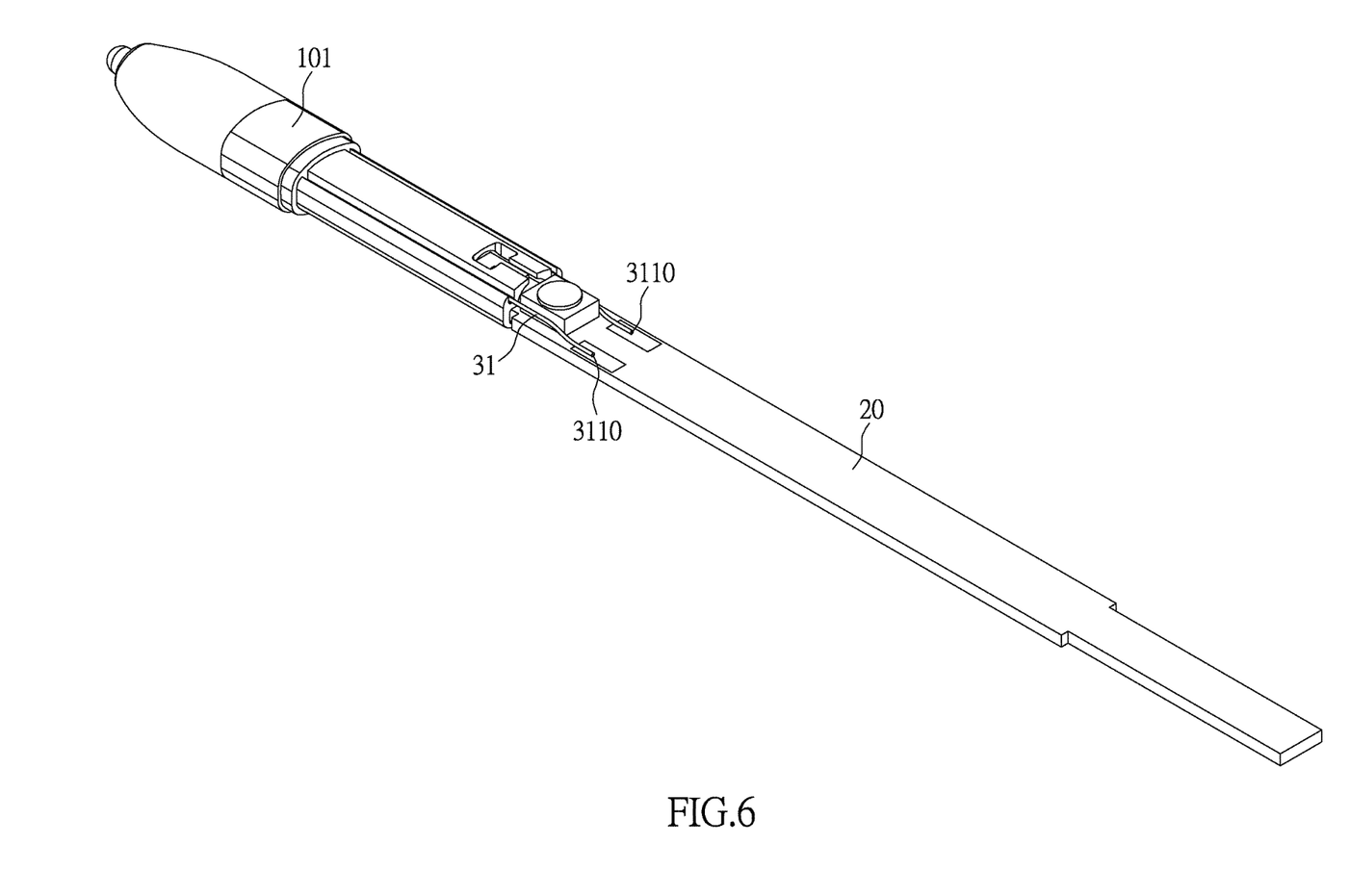
FIG. 6 shows a perspective, schematic view of the step S104 and the step S106 of the method of manufacturing a thin electromagnetic handwriting pen according to the instant disclosure.
Figure 7:
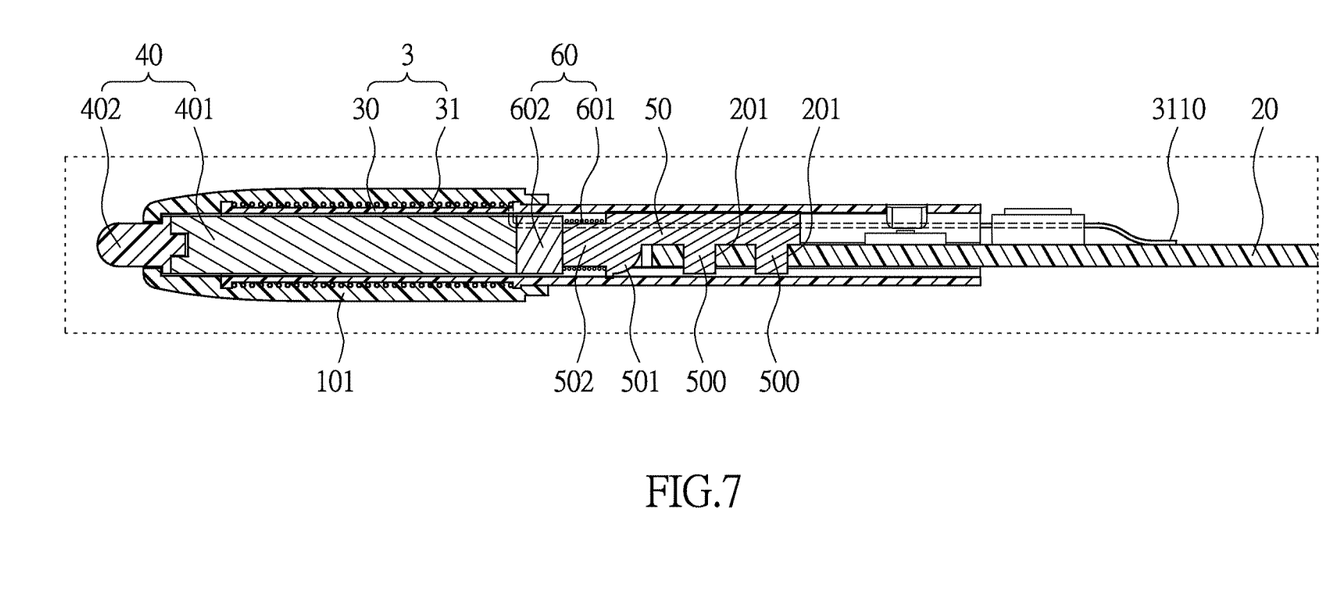
FIG. 7 shows a lateral, cross-sectional, schematic view of the step S104 and the step S106 of the method of manufacturing a thin electromagnetic handwriting pen according to the instant disclosure.

Then, step S104 is that: referring to FIG. 1, FIG. 6 and FIG. 7, sequentially inserting a pen core structure 40, an elastic structure 60, a connection structure 50 and one portion of a circuit substrate 20 into the first hollow outer tube 101, wherein one portion of the pen core structure 40 is exposed outside the first hollow outer tube 101. More precisely, the pen core structure 40 is movably disposed inside the first hollow outer tube 101 and passes through the hollow holder 30, the connection structure 50 is positioned on the circuit substrate 20, and the elastic structure 60 is connected between the pen core structure 40 and the connection structure 50. For example, the connection structure 50 is positioned on the front side portion of the circuit substrate 20 in advance, thus the connection structure 50 and the circuit substrate 20 are concurrently placed inside the first hollow outer tube 101.

Afterward, step S106 is that: referring to FIG. 1, FIG. 6 and FIG. 7, electrically connecting the two soldering portions 3110 of the electromagnetic coil 31 to the circuit substrate 20. For example, the two soldering portions 3110 of the electromagnetic coil 31 are respectively soldered on two conductive pads (not labeled) that are disposed on the top surface of the circuit substrate 20.

Figure 8:
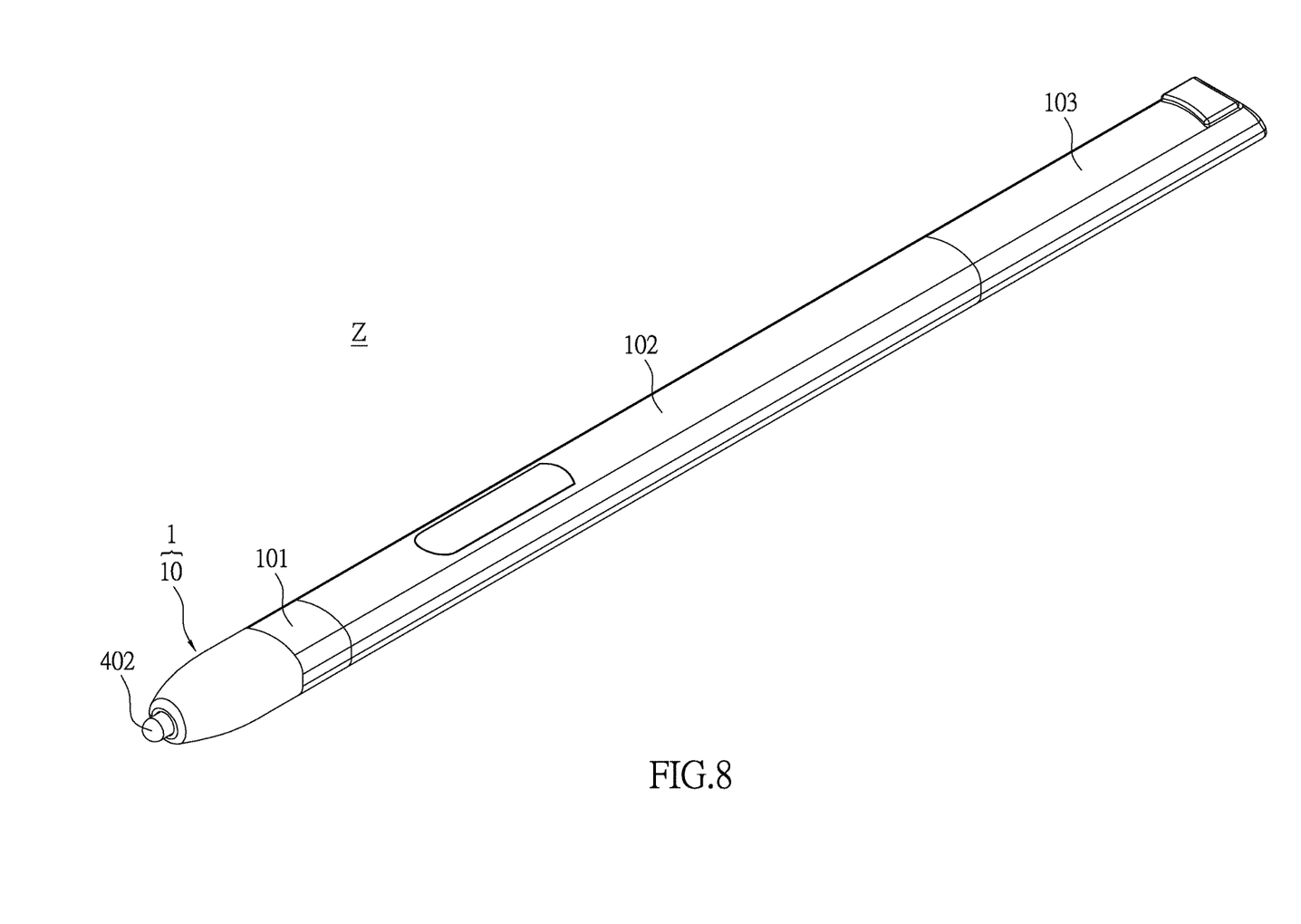
FIG. 8 shows a perspective, schematic view of the step S108 of the method of manufacturing a thin electromagnetic handwriting pen according to the instant disclosure.
Figure 9:
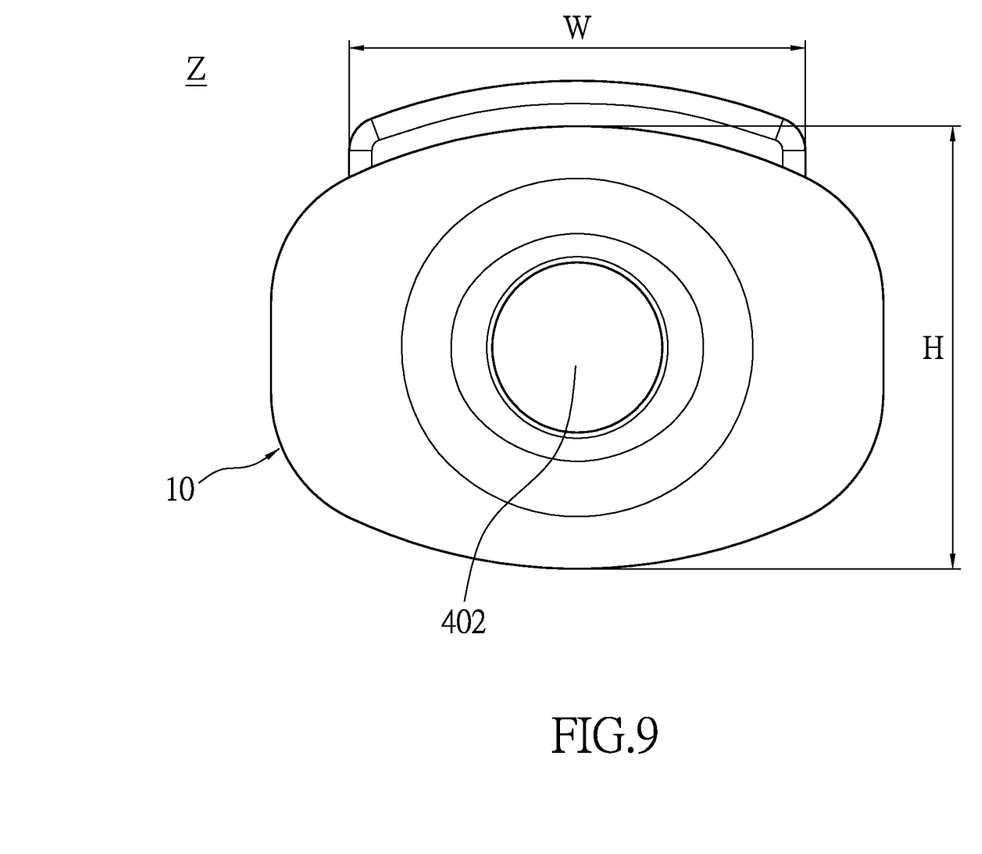
FIG. 9 shows a lateral, schematic view of the thin electromagnetic handwriting pen according to the instant disclosure.

Next, step S108 is that: referring to FIG. 1, FIG. 8 and FIG. 9, mating a second hollow outer tube 102 with the first hollow outer tube 101 and mating a pen tail cover 103 with the second hollow outer tube 102 for enclosing the other portion of the circuit substrate 20. More precisely, the first hollow outer tube 101, the second hollow outer tube 102 and the pen tail cover 103 are mated with each other to form a thin pen-shaped casing structure 10, but it is merely an example and is not meant to limit the instant disclosure. It is worth noting that, referring to FIG. 9, if the width W of the main portion of the thin pen-shaped casing structure 10 is substantially about 5.5 mm, the height H of the main portion of the thin pen-shaped casing structure 10 can be substantially reduced to 4.0 mm, for achieve the thin design of the thin electromagnetic handwriting pen Z. Hence, the thin electromagnetic handwriting pen Z can be applied to the thin portable electronic device (not shown), for example, the thin electromagnetic handwriting pen Z can be inserted into the edge hole of the thin portable electronic device (not shown).

Whereby, the instant disclosure provides a thin electromagnetic handwriting pen Z manufactured through the step S100 to the step S108, and the thin electromagnetic handwriting pen Z comprises a casing unit 1, a circuit unit 2, an electromagnetic unit 3, a pen core unit 4, a connection unit 5 and an elastic unit 6.

Figure 10:
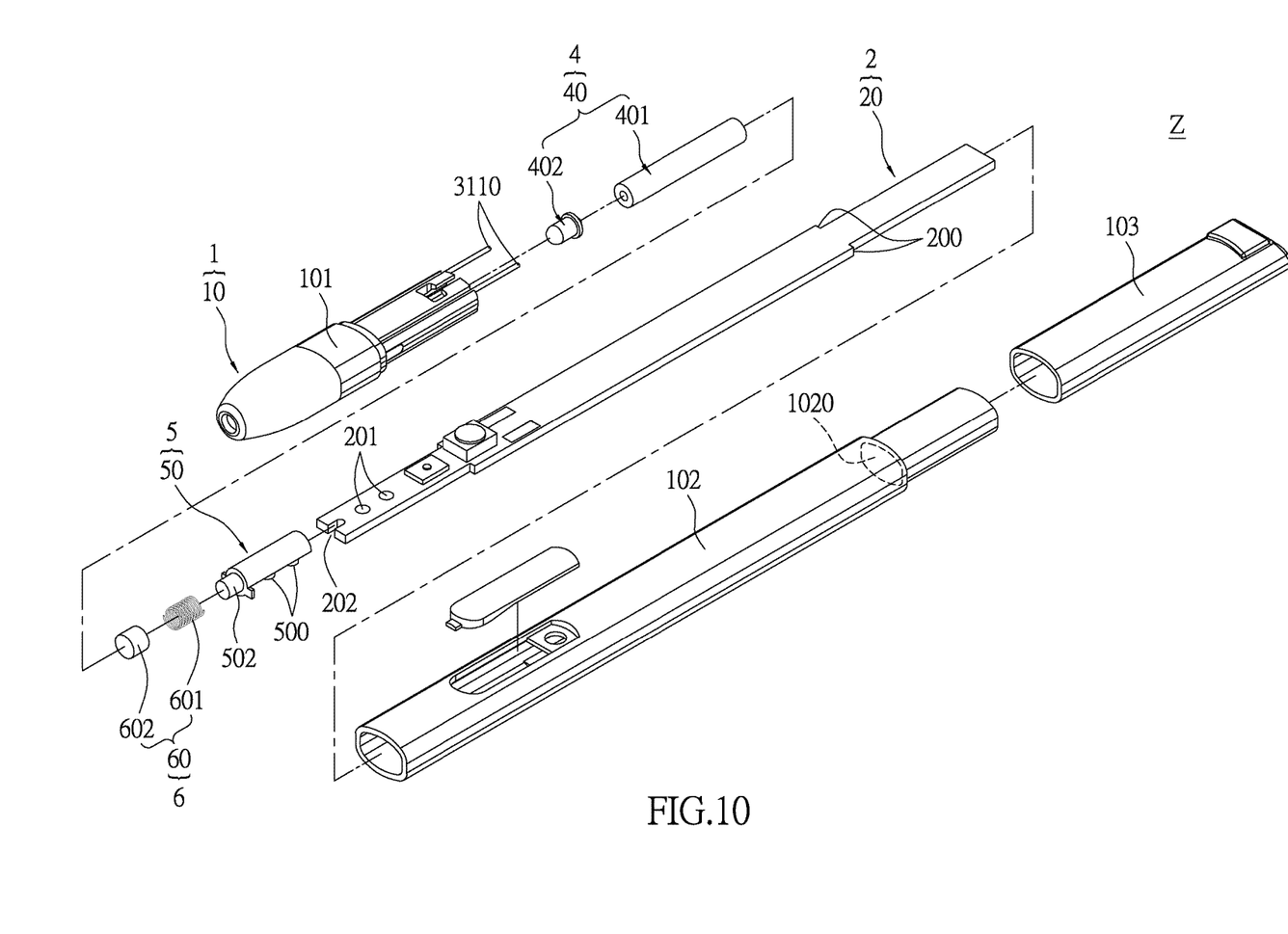
FIG. 10 shows a perspective, exploded, schematic view of the thin electromagnetic handwriting pen according to the instant disclosure.

First, referring to FIG. 7, FIG. 8 and FIG. 10, the casing unit 1 includes a thin pen-shaped casing structure 10, and the circuit unit 2 includes a circuit substrate 20 disposed inside the thin pen-shaped casing structure 10. More precisely, the thin pen-shaped casing structure 10 includes a first hollow outer tube 101, a second hollow outer tube 102 and a pen tail cover 103, and the second hollow outer tube 102 has two opposite lateral portions respectively mated with the first hollow outer tube 101 and the pen tail cover 103. In addition, the second hollow outer tube 102 has a stop portion 1020 disposed on the inner surface thereof, and the circuit substrate 20 has an abutting portion 200 backwardly abutted against the stop portion 1020 of the second hollow outer tube 102. The circuit substrate 20 has at least two positioning holes 201 adjacent to the connection structure 50 and at least one positioning groove 202 adjacent to the connection structure 50, and the positioning groove 202 is substantially disposed between one of the two positioning holes 201 and the connection structure 50.

Moreover, referring to FIG. 3, FIG. 7 and FIG. 10, the electromagnetic unit 3 includes a hollow holder 30 and an electromagnetic coil 31 wound around the hollow holder 30. Both the hollow holder 30 and the electromagnetic coil 31 are embedded in the thin pen-shaped casing structure 10, and the electromagnetic coil 31 is fixed between the thin pen-shaped casing structure 10 and the hollow holder 30 and electrically connected to the circuit substrate 20 through the two soldering portions 3110. More precisely, referring to FIG. 3, the hollow holder 30 has a coil winding portion 300 and a coil guiding portion 301 connected to the coil winding portion 300. The coil winding portion 300 has a coil winding space 3000, and the coil guiding portion 301 has at least two coil guiding grooves 3010 communicated with the coil winding space 3000. The electromagnetic coil 31 has a main coil portion 310 wound around the coil winding portion 300 and received in the coil winding space 3000 and two guiding coil portions 311 respectively connected to two opposite ends of the main coil portion 310 and respectively received in the at least two coil guiding grooves 3010. In addition, the main coil portion 310 of the electromagnetic coil 31 is totally enclosed inside the first hollow outer tube 101, and the soldering portion 3110 of each guiding coil portion 311 of the electromagnetic coil 31 is exposed outside the first hollow outer tube 101 to electrically connect with the soldering portion 3110 of the circuit substrate 20.

Furthermore, referring to FIG. 7, FIG. 8 and FIG. 10, the pen core unit 4 includes a pen core structure 40 movably disposed inside the thin pen-shaped casing structure 10 and passing through the hollow holder 30, and one portion of the pen core structure 40 is exposed outside the thin pen-shaped casing structure 10. More precisely, the pen core structure 40 includes a metal pen core 401 (such as an iron core or any conductive material) movably passing through the hollow holder 30 and a plastic pen head 402 connected to one end of the metal pen core 401, and one portion of the plastic pen head 402 is exposed outside the first hollow outer tube 101 of the thin pen-shaped casing structure 10.

In addition, referring to FIG. 7 and FIG. 10, the connection unit 5 includes a connection structure 50 disposed inside the thin pen-shaped casing structure 10 and positioned on the circuit substrate 20, and the elastic unit 6 includes an elastic structure 60 disposed inside the thin pen-shaped casing structure 10 and connected between the pen core structure 40 and the connection structure 50. More precisely, the connection structure 50 has at least two positioning posts 500 disposed on the bottom side thereof and respectively passing through the at least two positioning holes 201 and at least one positioning block 501 disposed on the bottom side thereof and retained in the at least one positioning groove 202, and the connection structure 50 has a convex post 502 disposed on a lateral side thereof and facing the elastic structure 60. Moreover, the elastic structure 60 includes a first elastic element 601 (such as a compression spring or an elastic piece) disposed around the convex post 502 and a second elastic element 602 (such as a compression spring or an elastic piece) disposed between another end of the metal pen core 401 and the convex post 502 of the connection structure 50 and contacting the first elastic element 601, and the two opposite ends of the second elastic element 602 are respectively abutted against another end of the metal pen core 401 and the convex post 502 of the connection structure 50.

In conclusion, the electromagnetic coil 31 can be fixed between the thin pen-shaped casing structure 10 and the hollow holder 30 and electrically connected to the circuit substrate 20 due to the design of both the hollow holder 30 and the electromagnetic coil 31 are embedded in the thin pen-shaped casing structure 10 and the processes of winding an electromagnetic coil 31 around a hollow holder 30 and forming a first hollow outer tube 101 to enclose the electromagnetic coil 31. Whereby, the hollow holder 30 and the electromagnetic coil 31 of the electromagnetic unit 3 can be fixed inside the thin pen-shaped casing structure Z without using any prior detachable holder to occupy the thickness of the thin pen-shaped casing structure Z, so as to achieve the thin design of the thin electromagnetic handwriting pen Z. Hence, the thin electromagnetic handwriting pen Z can be applied to the thin portable electronic device (not shown), for example, the thin electromagnetic handwriting pen Z can be inserted into the edge hole of the thin portable electronic device (not shown).

The above-mentioned descriptions merely represent the preferred embodiments of the instant disclosure, without any intention or ability to limit the scope of the instant disclosure which is fully described only within the following claims.

Various equivalent changes, alterations or modifications based on the claims of instant disclosure are all, consequently, viewed as being embraced by the scope of the instant disclosure.

What is claimed is:

1. A thin electromagnetic handwriting pen, comprising:
a casing of a thin pen-shaped casing structure including a first hollow outer tube, a second hollow outer tube, and a pen tail cover, the second hollow outer tube having two opposite lateral portions respectively mated with the first hollow outer tube and the pen tail cover, the second hollow outer tube having a stop portion disposed on the inner surface thereof;
circuitry including a circuit substrate disposed inside the thin pen-shaped casing structure, the circuit substrate having an abutting portion abutted against the stop portion of the second hollow outer tube, the circuit substrate having at least two positioning holes and at least one positioning groove;
an electromagnetic unit including a hollow holder and an electromagnetic coil wound around the hollow holder, wherein the electromagnetic unit is received in the thin pen-shaped casing structure, the hollow holder includes two coil guiding grooves extending along an axis of the thin pen-shaped casing structure, and the electromagnetic coil is fixed between the thin pen-shaped casing structure and the hollow holder and electrically connected to the circuit substrate with two end portions of the electromagnetic coil guided through the two coil guiding grooves, respectively, and connected to the circuit substrate;
a pen core including a metal pen core structure, which is movably disposed inside the thin pen-shaped casing structure and passing through the hollow holder, and a plastic pen head connected to a distal end of the metal pen core structure, wherein a distal portion of the plastic pen head is exposed outside the first hollow outer tube of the thin pen-shaped casing structure;
a connector including a connection structure disposed inside the thin pen-shaped casing structure and positioned on the circuit substrate, wherein a radial footprint of the connection structure, transverse to the axis of the thin pen-shaped casing structure, is substantially equal to a radial footprint of the pen core, the connection structure has at least two positioning posts respectively passing through the at least two positioning holes of the circuit substrate and at least one positioning block received in the at least one positioning groove of the circuit substrate, the connection structure has a convex post extending along the axis; and
an elastic structure disposed inside the thin pen-shaped casing structure and disposed between the metal pen core structure and the convex post of the connection structure, wherein a radial footprint of the elastic structure is substantially equal to the radial footprint of the pen core, the elastic structure including a first elastic element disposed around the convex post and a second elastic element disposed in contact with the first elastic element and between the convex post and the metal pen structure.

2. The thin electromagnetic handwriting pen of claim 1, wherein the hollow holder has a coil winding portion and a coil guiding portion adjacent to each other along the axis, the coil winding portion has a coil winding space, and the coil guiding portion has the two coil guiding grooves communicated with the coil winding space, wherein the electromagnetic coil has a main coil portion wound around the coil winding portion and received in the coil winding space and the two end portions respectively connected to two opposite ends of the main coil portion and respectively received in the two coil guiding grooves, the main coil portion of the electromagnetic coil is completely enclosed inside the first hollow outer tube, and each of the two end portions of the electromagnetic coil has a soldering portion exposed outside the first hollow outer tube to electrically connect to the circuit substrate.

3. The thin electromagnetic handwriting pen of claim 1, wherein the hollow holder is made of high temperature resistant material.

4. The thin electromagnetic handwriting pen of claim 1, wherein the electromagnetic coil is an enamel-insulated wire.

5. The thin electromagnetic handwriting pen of claim 1, wherein the first hollow outer tube is formed by an injection molding process.

6. The thin electromagnetic handwriting pen of claim 1, wherein the casing has a radial cross-sectional shape that is oval.

7. The thin electromagnetic handwriting pen of claim 1, wherein the casing has a radial cross-sectional shape that is rectangular with chamfered corners.

8. A method of manufacturing a thin electromagnetic handwriting pen, comprising:
winding an electromagnetic coil around a hollow holder, the hollow holder including two coil guiding grooves extending along an axial direction of the hollow holder;
guiding two end portions of the electromagnetic coil wound around the hollow holder through the two coil guiding grooves of the hollow holder, respectively;
providing a first hollow outer tube and positioning the electromagnetic coil between the first hollow outer tube and the hollow holder, wherein the two end portions of the electromagnetic coil respectively guided through the two coil guiding grooves each has a soldering portion exposed outside the first hollow outer tube;
sequentially inserting a metal pen core structure, an elastic structure, a connection structure and a distal portion of a circuit substrate into the first hollow outer tube, wherein a radial footprint of each of the elastic structure and the connection structure, transverse to an axis of the thin electromagnetic handwriting pen, is substantially equal to a radial footprint of the metal pen core structure, a distal portion of a plastic pen head connected to a distal end of the metal pen core structure is exposed outside the first hollow outer tube, the connection structure has at least two positioning posts respectively passing through at least two positioning holes defined in the circuit substrate, has at least one positioning block received in at least one positioning groove of the circuit substrate, and has a convex post extending along the axis, the elastic structure is disposed between the metal pen core structure and the convex post of the connection structure, and the elastic structure includes a first elastic element disposed around the convex post and a second elastic element disposed in contact with the first elastic element and between the convex post the metal pen core structure;
electrically connecting the two soldering portions of the two end portions of the electromagnetic coil to the circuit substrate; and
mating a second hollow outer tube with the first hollow outer tube and mating a pen tail cover with the second hollow outer tube, wherein the circuit substrate has an abutting portion abutted against a stop portion disposed on the inner surface of the second hollow outer tube.

9. The method of claim 8, wherein the first hollow outer tube is formed by an injection molding process, the first hollow outer tube, the second hollow outer tube and the pen tail cover are mated with each other to form a thin pen-shaped casing structure for the thin electromagnetic handwriting pen, and the metal pen core structure is movably disposed inside the thin pen-shaped casing structure and passing through the hollow holder.

10. The method of claim 8, wherein the hollow holder is made of high temperature resistant material.

11. The method of claim 8, wherein the electromagnetic coil is an enamel-insulated wire.

12. The method of claim 8, wherein the first hollow outer tube has a radial cross-sectional shape that is oval.

13. The method of claim 8, wherein the first hollow outer tube has a radial cross-sectional shape that is rectangular with chamfered corners.

* * * * *